UNITED STATES PATENT OFFICE.

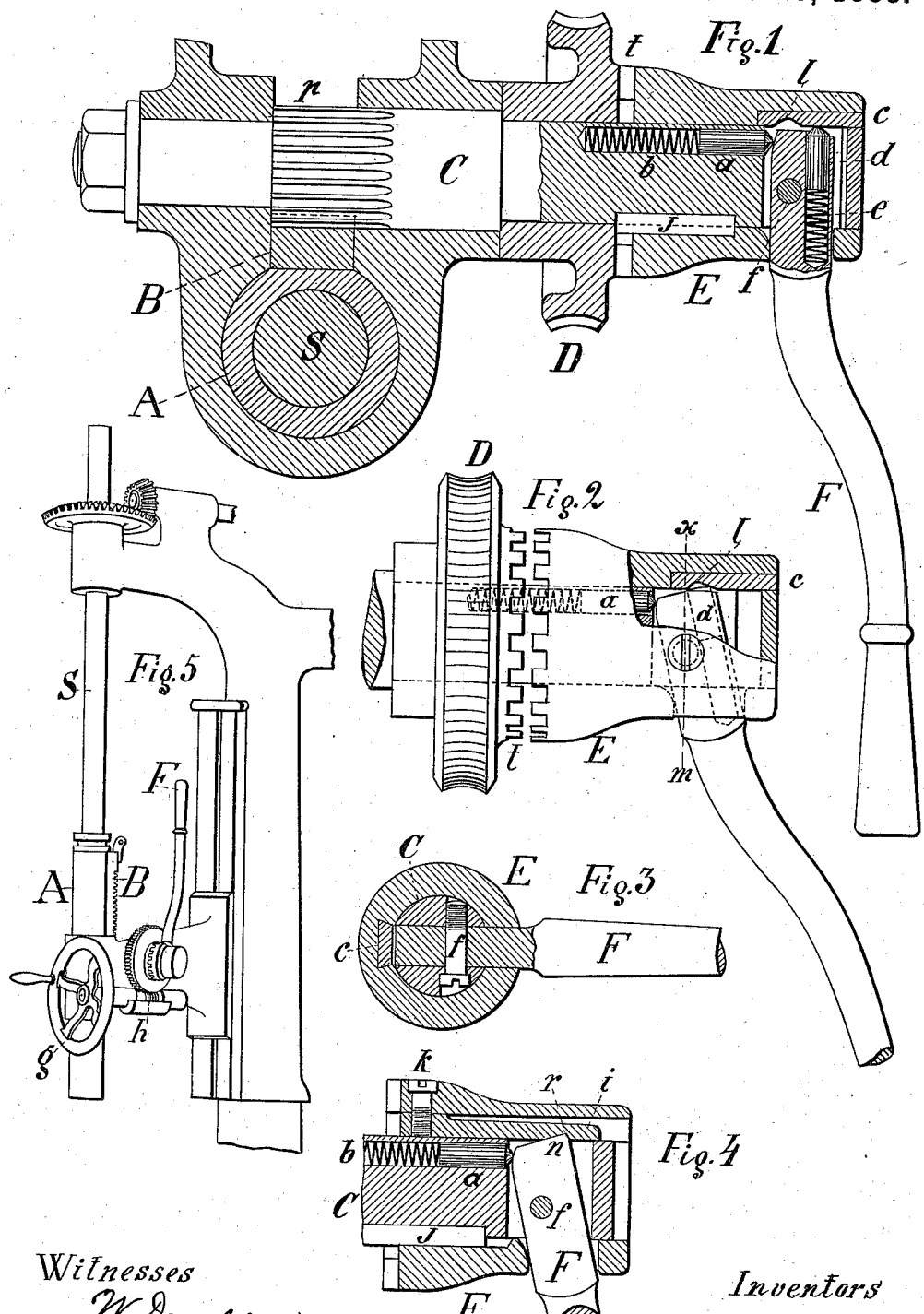

WILLIAM LODGE AND HENRY DRESES, OF CINCINNATI, OHIO.

FEEDING DEVICE FOR DRILLING.

SPECIFICATION forming part of Letters Patent No. 385,063, dated June 26, 1888.

Application filed December 24, 1887. Serial No. 258,926. (No model.)

*To all whom it may concern:*

Be it known that we, WILLIAM LODGE and HENRY DRESES, citizen of the United States, residing at Cincinnati, in the county of Hamilton and State of Ohio, have invented a new and useful Improvement in Feeding Devices for Drilling-Machines, fully described and represented in the following specification and accompanying drawings, forming part of the same.

Our invention relates to feeding devices for drilling-machines; and it consists of a new and useful quick-return mechanism to be used in connection with the ordinary feed device, as will be hereinafter more fully specified and described.

In the accompanying drawings, Figure 1 is a longitudinal section of an ordinary feeding device with our improved quick-return attached to it. Fig. 2 is an elevation of it with the main operating parts shown in section and clutch E disengaged from worm-wheel D. Fig. 3 is a section on the line x m. Fig. 4 shows a modification of the device, and Fig. 5 shows a part of an ordinary drilling-machine with our improved quick-return attached to it.

Similar letters refer to similar parts throughout the several views.

The usual drill-spindle, S, with sleeve A and rack B, are fed by worm-wheel D and worm h by means of shaft C with pinion p. Worm-wheel D runs loose on shaft C and forms on its outside a clutch, t, engaging with clutch E. Shaft C is slotted on its end and lever F pivoted into it by means of a screw, f. Lever F passes through clutch E on one side and fitting closely all round, and also by means of a feather, j, said clutch is kept from revolving on shaft C, but can be moved lengthwise by lever F.

When it is desired to feed or return the drill-spindle rapidly, the lever F is brought in position shown in Fig. 2, which disengages the clutch E from worm-wheel D, and by means of a spring, e, cone-shaped plug d, forming part of lever F, enters the recess l in plate c and keeps both lever and clutch in this position. This may be modified in giving the lever F a projection, n, entering recess r in flat spring i, fastened to clutch E by screw k, as shown in Fig. 4. In this state the drill-spindle may be elevated or depressed, while the worm and worm-wheel remain stationary.

When lever F is tilted so far to the left that plug d or projection n leaves recess l or r, plug a, with spring b beneath, forming part of feed-shaft C, will force the clutch E into the corresponding clutch on worm-wheel D. Then the whole feed mechanism is connected and may be rotated by the hand-wheel g.

Having thus described the mode of operation, we claim as new, and desire to secure by Letters Patent, the following:

1. In a drilling-machine, a clutch, E, sliding on feed-shaft C, in combination with a lever, F, passing through one side of said clutch, pivoted into the slotted feed-shaft C, and so constructed as by moving said lever in the axial plane of shaft C to engage or disengage half-clutch E with clutch t, formed on worm-wheel D, substantially as described.

2. The combination, in a drilling-machine, of a slotted feed-shaft, C, the plug a, and a spring, b, beneath the plug a, in connection with lever F, pivoted to shaft C, and adapted to force clutch E into the corresponding clutch, t, formed on outside of worm-wheel D, all substantially as set forth.

3. The combination of a clutch, E, with flat spring i fastened to it, in connection with lever F, having the projection n to enter recess r in said spring, substantially as shown, and for the purpose specified.

WILLIAM LODGE.
HENRY DRESES.

Witnesses:
ROBERT C. GEORGI,
B. E. DILLEY.